Patented Feb. 28, 1933

1,899,348

UNITED STATES PATENT OFFICE

HEINRICH NERESHEIMER AND WILHELM SCHNEIDER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PURIFICATION OF VAT DYESTUFFS OF THE ANTHRAQUINONEAZINE SERIES

No Drawing. Application filed March 5, 1931, Serial No. 520,463, and in Germany March 10, 1930.

The present invention relates to the manufacture of vat dyestuffs of the N-dihydro-1.2.2'.1'-anthraquinoneazine series which are fast to chlorine.

According to the process described in the U. S. Patent No. 785,122 a vat dyestuff which dyes cotton pure green blue shades and generally of excellent fastness is obtained by the action of formaldehyde on N-dihydro-1.2.2'.1'-anthraquinoneazine (Indanthrene blue RS, Color Index 1924, No. 1106) in acid solution. To this dyestuff there is, however, the objection that it has only a comparatively slight fastness to chlorine.

We have now found that dyestuffs producing dyeings which are considerably more fast to chlorine than those obtained with the dyestuff hereinbefore referred to are obtained by removing components not fast to chlorine from the condensation products obtainable from impure N-dihydro-1.2.2'.1'-anthraquinoneazine and formaldehyde or agents supplying formaldehyde such as paraformaldehyde, methylal and glycolic acid, by means of sulphuric acid of at least 70 per cent strength. By the term "impure N-dihydro-1.2.2'.1'-anthraquinoneazine" we intend to define dyestuffs of the purity of the commercial Indanthrene blue RS (Color Index 1924, No. 1106). The removal of the components not fast to chlorine may either be effected by fractionally precipitating the said condensation products from their solution in concentrated sulphuric acid by dilution only to such an extent that the concentration of the sulphuric acid is not reduced to below 70 per cent strength, whereby the said components not fast to chlorine remain dissolved in the sulphuric acid, or by extracting from the said condensation products components not fast to chlorine by means of dilute sulphuric acid of at least 70 per cent strength. Dyestuffs giving more or less greenish blue dyeings are obtained by the process according to the present invention depending on the amount of formaldehyde employed and on the reaction conditions. The purification may be effected for example by adding water either as such or in the form of dilute sulphuric acid in such an amount to a solution of the dyestuff obtained by the treatment of impure commercial N-dihydro-1.2.2'.1'-anthraquinoneazine in concentrated sulphuric acid with formaldehyde that the dyestuff fast to chlorine separates out.

It is surprising that dyestuffs substantially faster to chlorine than the intitial material can be obtained in the said simple manner, since on the one hand the condensation products of N-dihydro-1.2.2'.1'-anthraquinoneazine and formaldehyde are considerably more soluble in fairly dilute sulphuric acid than N-dihydro-1.2.2'.1'-anthraquinoneazine itself and on the other hand it is known that the impurities not fast to chlorine present in commercial N-dihydro-1.2.2'.1'-anthraquinoneazine are likewise comparatively soluble in fairly dilute sulphuric acid as results from the U. S. Patent No. 1,541,156. It was therefore to be expected that the difference between the solubilities of both products in fairly dilute sulphuric acid would be very small and a separation by the said means would not be possible or possible only to an insufficient degree.

The shades produced with the dyestuffs purified in the manner hereinbefore described may be varied by subjecting the said dyestuffs to a further treatment with alkalies or oxidizing or halogenating agents.

The following examples will further illustrate how the said invention may be carried out in practice, but the invention is not restricted to these examples. The parts are by weight.

Example 1

1 part of paraformaldehyde is added at 5° C. to a solution of 10 parts of commercial Indanthrene blue RS (see Color Index, 1924, No. 1106) in 100 parts of sulphuric acid of 66° Bé. strength, and the reaction mixture is stirred at the said temperature for 15 hours. 25 parts of water are then allowed to drop in in such a manner that the temperature finally amounts to 20° C. and the whole is stirred for an hour at the same temperature, the product which separates out being filtered off by suction and worked up in the usual manner. A dyestuff is obtained which dyes cotton from a blue vat more greenish blue shades having a substantially better fastness to chlorine than the initial material. The impurities in the dyestuff which are not fast to chlorine may be precipitated from the mother liquor in the form of a greenish blue flocculent precipitate by pouring into water.

*Example 2*

Indanthrene blue RS, commercial brand, is condensed with paraformaldehyde in the manner described in the foregoing example. The condensation product is recovered by pouring the reaction mixture into water, filtering off the precipitate, washing and drying it. 10 parts of the dyestuff thus obtained are finely ground and introduced at 15° C. into 100 parts of sulphuric acid of 85 per cent strength. The mixture is stirred at the said temperature until no more of the product passes into solution, the undissolved dyestuff then being filtered off and worked up as usual. It dyes cotton from a blue vat shades very similar to those obtained with the dyestuff produced according to Example 1.

What we claim is:—

1. In the manufacture of vat dyestuffs of the N-dihydro-1.2.2'.1'-anthraquinoneazine series the step which comprises removing components not fast to chlorine from a condensation product of impure N-dihydro-1.2.2'.1'-anthraquinoneazine and formaldehyde by means of sulphuric acid of at least 70 per cent strength.

2. In the manufacture of vat dyestuffs of the N-dihydro-1.2.2'.1'-anthraquinoneazine series the step, which comprises dissolving a condensation product of impure N-dihydro-1.2.2'.1'-anthraquinoneazine and formaldehyde in concentrated sulphuric acid, diluting the solution by adding water in such amounts to reduce the concentration of sulphuric acid not below 70 per cent strength, and recovering the undissolved part of the said condensation product.

3. In the manufacture of vat dyestuffs of the N-dihydro-1.2.2'.1'-anthraquinoneazine series the step, which comprises digesting a condensation product of impure N-dihydro-1.2.2'.1'-anthraquinoneazine and formaldehyde with sulphuric acid of at least 70 per cent strength, and recovering the undissolved part of the said condensation product.

In testimony whereof we have hereunto set our hands.

HEINRICH NERESHEIMER.
WILHELM SCHNEIDER.